US009851762B1

(12) United States Patent  
Baik et al.

(10) Patent No.: US 9,851,762 B1  
(45) Date of Patent: Dec. 26, 2017

(54) COMPLIANT PRINTED CIRCUIT BOARD ('PCB') WITHIN AN ENCLOSURE

(71) Applicant: Pure Storage, Inc., Mountain View, CA (US)

(72) Inventors: David Baik, Sunnyvale, CA (US); William Cerreta, San Mateo, CA (US); Peter Kirkpatrick, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 6 days.

(21) Appl. No.: 14/819,995

(22) Filed: Aug. 6, 2015

(51) Int. Cl.
*G06F 1/16* (2006.01)
*G06F 1/18* (2006.01)

(52) U.S. Cl.
CPC .............. *G06F 1/183* (2013.01); *G06F 1/181* (2013.01)

(58) Field of Classification Search
CPC .............. H05K 1/141; H05K 3/326; H05K 2201/10318; H05K 5/0221; H05K 1/02; H05K 1/18; G06F 1/183; G06F 1/181; G06F 1/187; G06F 1/1632; G06F 1/1616; G06F 1/1626; G06F 1/1656; E05B 73/0082
USPC .............. 361/679.33–679.39, 724–727, 752, 361/679.43, 679.55–679.58; 312/223.1–223.2
See application file for complete search history.

(56) References Cited

U.S. PATENT DOCUMENTS

| 4,806,105 A * | 2/1989 | Muzslay ................ H01R 12/52 439/74 |
| 5,706,210 A | 1/1998 | Kumano et al. |
| 5,799,200 A | 8/1998 | Brant et al. |
| 5,933,598 A | 8/1999 | Scales et al. |
| 6,012,032 A | 1/2000 | Donovan et al. |
| 6,085,333 A | 7/2000 | DeKoning et al. |
| 6,643,641 B1 | 11/2003 | Snyder |
| 6,647,514 B1 | 11/2003 | Umberger et al. |
| 6,789,162 B1 | 9/2004 | Talagala et al. |
| 7,089,272 B1 | 8/2006 | Garthwaite et al. |
| 7,107,389 B2 | 9/2006 | Inagaki et al. |

(Continued)

FOREIGN PATENT DOCUMENTS

| EP | 0725324 A2 | 8/1996 |
| WO | WO 2012/087648 A1 | 6/2012 |

(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

(Continued)

*Primary Examiner* — Anthony Haughton  
*Assistant Examiner* — Ingrid Wright  
(74) *Attorney, Agent, or Firm* — Edward J. Lenart; Kennedy Lenart Spraggins LLP

(57) ABSTRACT

A computing system that includes a computing device, the computing device comprising: an enclosure; a printed circuit board ('PCB') movably affixed to the enclosure; a force imparting component coupled to the PCB, the force imparting component configured to exert a force on the PCB when the computing device enclosure is inserted into a computing device receptacle.

12 Claims, 6 Drawing Sheets

(56) References Cited

U.S. PATENT DOCUMENTS

| | | | |
|---|---|---|---|
| 7,146,521 B1 | 12/2006 | Nguyen | |
| 7,334,124 B2 | 2/2008 | Pham et al. | |
| 7,437,530 B1 | 10/2008 | Rajan | |
| 7,493,424 B1 | 2/2009 | Bali et al. | |
| 7,669,029 B1 | 2/2010 | Mishra et al. | |
| 7,682,169 B2 * | 3/2010 | Park | H01R 25/006 439/159 |
| 7,689,609 B2 | 3/2010 | Lango et al. | |
| 7,743,191 B1 | 6/2010 | Liao | |
| 7,899,780 B1 | 3/2011 | Shmuylovich et al. | |
| 8,042,163 B1 | 10/2011 | Karr et al. | |
| 8,086,585 B1 | 12/2011 | Brashers et al. | |
| 8,271,700 B1 | 9/2012 | Annem et al. | |
| 8,387,136 B2 | 2/2013 | Lee et al. | |
| 8,437,189 B1 | 5/2013 | Montierth et al. | |
| 8,465,332 B2 | 6/2013 | Hogan et al. | |
| 8,527,544 B1 | 9/2013 | Colgrove et al. | |
| 8,566,546 B1 | 10/2013 | Marshak et al. | |
| 8,578,442 B1 | 11/2013 | Banerjee | |
| 8,613,066 B1 | 12/2013 | Brezinski et al. | |
| 8,620,970 B2 | 12/2013 | English et al. | |
| 8,751,463 B1 | 6/2014 | Chamness | |
| 8,762,642 B2 | 6/2014 | Bates et al. | |
| 8,769,622 B2 | 7/2014 | Chang et al. | |
| 8,800,009 B1 | 8/2014 | Beda, III et al. | |
| 8,812,860 B1 | 8/2014 | Bray | |
| 8,850,546 B1 | 9/2014 | Field et al. | |
| 8,898,346 B1 | 11/2014 | Simmons | |
| 8,909,854 B2 | 12/2014 | Yamagishi et al. | |
| 8,931,041 B1 | 1/2015 | Banerjee | |
| 8,949,863 B1 | 2/2015 | Coatney et al. | |
| 8,984,602 B1 | 3/2015 | Bailey et al. | |
| 8,990,905 B1 | 3/2015 | Bailey et al. | |
| 9,124,569 B2 | 9/2015 | Hussain et al. | |
| 9,134,922 B2 | 9/2015 | Rajagopal et al. | |
| 9,209,973 B2 | 12/2015 | Aikas et al. | |
| 9,250,823 B1 | 2/2016 | Kamat et al. | |
| 9,300,660 B1 | 3/2016 | Borowiec et al. | |
| 9,444,822 B1 | 9/2016 | Borowiec et al. | |
| 9,507,532 B1 | 11/2016 | Colgrove et al. | |
| 9,519,318 B2 * | 12/2016 | Davis | G06F 1/187 |
| 2002/0013802 A1 | 1/2002 | Mori et al. | |
| 2003/0145172 A1 | 7/2003 | Galbraith et al. | |
| 2003/0191783 A1 | 10/2003 | Wolczko et al. | |
| 2003/0225961 A1 | 12/2003 | Chow et al. | |
| 2004/0080985 A1 | 4/2004 | Chang et al. | |
| 2004/0111573 A1 | 6/2004 | Garthwaite | |
| 2004/0153844 A1 | 8/2004 | Ghose et al. | |
| 2004/0193814 A1 | 9/2004 | Erickson et al. | |
| 2004/0260967 A1 | 12/2004 | Guha et al. | |
| 2005/0160416 A1 | 7/2005 | Jamison | |
| 2005/0188246 A1 | 8/2005 | Emberty et al. | |
| 2005/0216800 A1 | 9/2005 | Bicknell et al. | |
| 2006/0015771 A1 | 1/2006 | Vana Gundy et al. | |
| 2006/0129817 A1 | 6/2006 | Borneman et al. | |
| 2006/0161726 A1 | 7/2006 | Lasser | |
| 2006/0230245 A1 | 10/2006 | Gounares et al. | |
| 2006/0239075 A1 | 10/2006 | Williams et al. | |
| 2007/0022227 A1 | 1/2007 | Miki | |
| 2007/0028068 A1 | 2/2007 | Golding et al. | |
| 2007/0055702 A1 | 3/2007 | Fridella et al. | |
| 2007/0109856 A1 | 5/2007 | Pellicone et al. | |
| 2007/0150689 A1 | 6/2007 | Pandit et al. | |
| 2007/0168321 A1 | 7/2007 | Saito et al. | |
| 2007/0220227 A1 | 9/2007 | Long | |
| 2007/0294563 A1 | 12/2007 | Bose | |
| 2007/0294564 A1 | 12/2007 | Reddin et al. | |
| 2008/0005587 A1 | 1/2008 | Ahlquist | |
| 2008/0077825 A1 | 3/2008 | Bello et al. | |
| 2008/0089020 A1 * | 4/2008 | Hiew | H05K 9/0067 361/679.31 |
| 2008/0162674 A1 | 7/2008 | Dahiya | |
| 2008/0195833 A1 | 8/2008 | Park | |
| 2008/0270678 A1 | 10/2008 | Cornwell et al. | |
| 2008/0282045 A1 | 11/2008 | Biswas et al. | |
| 2009/0077340 A1 | 3/2009 | Johnson et al. | |
| 2009/0100115 A1 | 4/2009 | Park et al. | |
| 2009/0198889 A1 | 8/2009 | Ito et al. | |
| 2010/0052625 A1 | 3/2010 | Cagno et al. | |
| 2010/0211723 A1 | 8/2010 | Mukaida | |
| 2010/0246266 A1 | 9/2010 | Park et al. | |
| 2010/0257142 A1 | 10/2010 | Murphy et al. | |
| 2010/0262764 A1 | 10/2010 | Liu et al. | |
| 2010/0325345 A1 | 12/2010 | Ohno et al. | |
| 2010/0332754 A1 | 12/2010 | Lai et al. | |
| 2011/0072290 A1 | 3/2011 | Davis et al. | |
| 2011/0125955 A1 | 5/2011 | Chen | |
| 2011/0131231 A1 | 6/2011 | Haas et al. | |
| 2011/0167221 A1 | 7/2011 | Pangal et al. | |
| 2012/0023144 A1 | 1/2012 | Rub | |
| 2012/0054264 A1 | 3/2012 | Haugh et al. | |
| 2012/0079318 A1 | 3/2012 | Colgrove et al. | |
| 2012/0131253 A1 | 5/2012 | McKnight et al. | |
| 2012/0303919 A1 | 11/2012 | Hu et al. | |
| 2012/0311000 A1 | 12/2012 | Post et al. | |
| 2013/0007845 A1 | 1/2013 | Chang et al. | |
| 2013/0031414 A1 | 1/2013 | Dhuse et al. | |
| 2013/0036272 A1 | 2/2013 | Nelson | |
| 2013/0071087 A1 | 3/2013 | Motiwala et al. | |
| 2013/0145447 A1 | 6/2013 | Maron | |
| 2013/0191555 A1 | 7/2013 | Liu | |
| 2013/0198459 A1 | 8/2013 | Joshi et al. | |
| 2013/0205173 A1 | 8/2013 | Yoneda | |
| 2013/0219164 A1 | 8/2013 | Hamid | |
| 2013/0227201 A1 | 8/2013 | Talagala et al. | |
| 2013/0290607 A1 | 10/2013 | Chang et al. | |
| 2013/0311434 A1 | 11/2013 | Jones | |
| 2013/0318297 A1 | 11/2013 | Jibbe et al. | |
| 2013/0332614 A1 | 12/2013 | Brunk et al. | |
| 2014/0020083 A1 | 1/2014 | Fetik | |
| 2014/0074850 A1 | 3/2014 | Noel et al. | |
| 2014/0082715 A1 | 3/2014 | Grajek et al. | |
| 2014/0086146 A1 | 3/2014 | Kim et al. | |
| 2014/0090009 A1 | 3/2014 | Li et al. | |
| 2014/0096220 A1 | 4/2014 | Da Cruz Pinto et al. | |
| 2014/0101434 A1 | 4/2014 | Senthurpandi et al. | |
| 2014/0164774 A1 | 6/2014 | Nord et al. | |
| 2014/0173232 A1 | 6/2014 | Reohr et al. | |
| 2014/0195636 A1 | 7/2014 | Karve et al. | |
| 2014/0201512 A1 | 7/2014 | Seethaler et al. | |
| 2014/0201541 A1 | 7/2014 | Paul et al. | |
| 2014/0208155 A1 | 7/2014 | Pan | |
| 2014/0215590 A1 | 7/2014 | Brand | |
| 2014/0229654 A1 | 8/2014 | Goss et al. | |
| 2014/0230017 A1 | 8/2014 | Saib | |
| 2014/0258526 A1 | 9/2014 | Le Sant et al. | |
| 2014/0282983 A1 | 9/2014 | Ju et al. | |
| 2014/0285917 A1 | 9/2014 | Cudak et al. | |
| 2014/0325262 A1 | 10/2014 | Cooper et al. | |
| 2014/0351627 A1 | 11/2014 | Best et al. | |
| 2014/0373104 A1 | 12/2014 | Gaddam et al. | |
| 2014/0373126 A1 | 12/2014 | Hussain et al. | |
| 2015/0026387 A1 | 1/2015 | Sheredy et al. | |
| 2015/0074463 A1 | 3/2015 | Jacoby et al. | |
| 2015/0089569 A1 | 3/2015 | Sondhi et al. | |
| 2015/0095515 A1 | 4/2015 | Krithivas et al. | |
| 2015/0113203 A1 | 4/2015 | Dancho et al. | |
| 2015/0121137 A1 | 4/2015 | McKnight et al. | |
| 2015/0134929 A1 | 5/2015 | Anderson et al. | |
| 2015/0149822 A1 | 5/2015 | Coronado et al. | |
| 2015/0193169 A1 | 7/2015 | Sundaram et al. | |
| 2015/0378888 A1 | 12/2015 | Zhang et al. | |
| 2016/0098323 A1 | 4/2016 | Mutha et al. | |
| 2016/0350009 A1 | 12/2016 | Cerreta et al. | |
| 2016/0352720 A1 | 12/2016 | Hu et al. | |
| 2016/0352830 A1 | 12/2016 | Borowiec et al. | |
| 2016/0352834 A1 | 12/2016 | Borowiec et al. | |

FOREIGN PATENT DOCUMENTS

| | | |
|---|---|---|
| WO | WO 2013071087 A1 | 5/2013 |
| WO | WO 2014/110137 A1 | 7/2014 |
| WO | WO 2016/015008 A1 | 12/2016 |
| WO | WO 2016/190938 A1 | 12/2016 |

(56) References Cited

FOREIGN PATENT DOCUMENTS

| WO | WO 2016/195759 A1 | 12/2016 |
| WO | WO 2016/195958 A1 | 12/2016 |
| WO | WO 2016/195961 A1 | 12/2016 |

OTHER PUBLICATIONS

PCMag. "Storage Array Definition". Published May 10, 2013. <http://web.archive.org/web/20130510121646/http://www.pcmag.com/encyclopedia/term/52091/storage-array>, 2 pages.

Google Search of "storage array define" performed by the Examiner on Nov. 4, 2015 for U.S. Appl. No. 14/725,278, Results limited to entries dated before 2012, 1 page.

Techopedia. "What is a disk array". Published Jan. 13, 2012. <http://web.archive.org/web/20120113053358/http://www.techopedia.com/definition/1009/disk-array>, 1 page.

Webopedia. "What is a disk array". Published May 26, 2011. <http://web/archive.org/web/20110526081214/http://www-,webopedia.com/TERM/D/disk_array.html>, 2 pages.

Li et al., *Access Control for the Services Oriented Architecture*, Proceedings of the 2007 ACM Workshop on Secure Web Services (SWS '07), Nov. 2007, pp. 9-17, ACM New York, NY.

The International Serach Report and the Written Opinoin received from the International Searching Authority (ISA/EPO) for International Application No. PCT/US2016/015006, dated Apr. 29, 2016, 12 pages.

The International Serach Report and the Written Opinoin received from the International Searching Authority (ISA/EPO) for International Application No. PCT/US2016/015008, dated May 4, 2016, 12 pages.

C. Hota et al., *Capability-based Cryptographic Data Access Controlin Cloud Computing*, Int. J. Advanced Networking and Applications, col. 1, Issue 1, dated Aug. 2011, 10 pages.

The International Search Report and the Written Opinion received from the International Searching Authority (ISA/EPO) for International Application No. PCT/US2016/020410, dated Jul. 8, 2016, 17 pages.

The International Search Report and the Written Opinion received from the International Searching Authority (ISA/EPO) for International Application No. PCT/US2016/032084, dated Jul. 18, 2016, 12 pages.

Faith, "dictzip file format", GitHub.com (online). [accessed Jul. 28, 2015], 1 page, URL: https://github.com/fidlej/idzip.

Wikipedia, "Convergent Encryption", Wikipedia.org (online), accessed Sep. 8, 2015, 2 pages, URL: en.wikipedia.org/wiki/Convergent_encryption.

Storer et al., "Secure Data Deduplication", Proceedings of the 4th ACM International Workshop on Storage Security and Survivability (StorageSS'08), Oct. 2008, 10 pages, ACM New York, NY. USA. DOI: 10.1145/1456469.1456471.

The International Serach Report and the Written Opinoin received from the International Searching Authority (ISA/EPO) for International Application No. PCT/US2016/016333, dated Jun. 8, 2016, 12 pages.

ETSI, *Network Function Virtualisation (NFV); Resiliency Requirements*, ETSI GS NFCV-REL 001, V1.1.1, http://www.etsi.org/deliver/etsi_gs/NFV-REL/001_099/001/01.01.01_60/gs_NFV-REL001v010101p.pdf (online), dated Jan. 2015, 82 pages.

The International Search Report and the Written Opinoin received from the International Searching Authority (ISA/EPO) for International Application No. PCT/US2016/032052, dated Aug. 30, 2016, 17 pages.

Microsoft, "Hybrid for SharePoint Server 2013—Security Reference Architecture", <http://hybrid.office.com/img/Security_Reference_Architecture.pdf> (online), dated Oct. 2014, 53 pages.

Microsoft, "Hybrid Identity", <http://aka.ms/HybridIdentityWp> (online), dated Apr. 2014, 36 pages.

Microsoft, "Hybrid Identity Management", <http://download.microsoft.com/download/E/A/E/EAE57CD1-A80B-423C-96BB-142FAAC630139/Hybrid_Identity_Datasheet.pdf> (online), published Apr. 2014, 17 pages.

Jacob Bellamy-McIntyre et al., "OpenID and the EnterpriseL a Model-based Analysis of Single Sign-On Authentication", 2011 15th IEEE International Enterprise Distributed Object Computing Conference (EDOC), DOI: 10.1109/EDOC.2011.26, ISBN: 978-1-4577-0362-1, <https://www.cs.auckland.ac.nz/~lutteroth/publications/McIntyreLutterothWeber2011-OpenID.pdf> (online), dated Aug. 29, 2011, 10 pages.

The International Search Report and the Written Opinoin received from the International Searching Authority (ISA/EPO) for International Application No. PCT/US2016/035492, dated Aug. 17, 2016, 10 pages.

The International Search Report and the Written Opinion received from the International Searching Authority (ISA/EPO) for International Application No. PCT/US2016/036693, dated Aug. 29, 2016, 10 pages.

The International Search Report and the Written Opinion received from the International Searching Authority (ISA/EP) for International Application No. PCT/US2016/038758, dated Oct. 7, 2016, 10 pages.

The International Search Report and the Written Opinion received from the International Searching Authority (ISA/EP) for International Application No. PCT/US2016/040393, dated Sep. 22, 2016, 10 pages.

The International Search Report and the Written Opinion received from the International Searching Authority (ISA/EP) for International Application No. PCT/US2016/044020, dated Sep. 30, 2016, 11 pages.

Kwok Kong, Using PCI Express as the Primary System Interconnect in Multiroot Compute, Storage, Communications and Embedded Systems, IDT, White Paper, <http://www.idt.com/document/whp/idt-pcie-multi-root-white-paper>, retrieved by WIPO Dec. 4, 2014, dated Aug. 28, 2008, 12 pages.

The International Search Report and the Written Opinion received from the International Searching Authority (ISA/EP) for International Application No. PCT/US2016/044874, dated Oct. 7, 2016, 11 pages.

The International Search Report and the Written Opinion received from the International Searching Authority (ISA/EP) for International Application No. PCT/US2016/044875, dated Oct. 5, 2016, 13 pages.

The International Search Report and the Written Opinion received from the International Searching Authority (ISA/EP) for International Application No. PCT/US2016/044876, dated Oct. 21, 2016, 12 pages.

The International Search Report and the Written Opinion received from the International Searching Authority (ISA/EP) for International Application No. PCT/US2016/044877, dated Sep. 29, 2016, 13 pages.

Xiao-Yu Hu et al., *Container Marking: Combining Data Placement, Garbage Collection and Wear Levelling for Flash*, 19th Annual IEEE International Symposium on Modelling, Analysis, and Simulation of Computer and Telecommunications Systems, ISBN: 978-0/7695-4430-4, DOI: 10.1109/MASCOTS.2011.50, dated Jul. 25-27, 2011, 11 pages.

\* cited by examiner

US 9,851,762 B1

COMPLIANT PRINTED CIRCUIT BOARD ('PCB') WITHIN AN ENCLOSURE

BACKGROUND OF THE INVENTION

Field of the Invention

The field of the invention is compliant PCBs within an enclosure.

Description of Related Art

Modern computing systems can include many modular components that are pieced together to form a larger computing system. For example, a computing system may include a mounting chassis into which a plurality of computing devices may be inserted. Such computing devices will frequently be electrically connected to other computing devices, connected to data communications adapters, connected to data communications cables and busses, and so on.

To form such computing systems and to support such interconnected devices, the systems may be designed by making assumptions about the physical form of the components that form the computing system. For example, the computing system may be designed to accommodate computing devices with a known set of physical dimensions. The actual physical dimensions of the computing devices, however, may vary slightly due to imperfections in the manufacturing process, physical damage to the computing devices, and other causes.

SUMMARY OF THE INVENTION

Devices, systems, and method of manufacture are disclosed. In one embodiment, a computing device is disclosed that includes an enclosure, a PCB movably affixed to the enclosure, and a force imparting component coupled to the PCB, the force imparting component configured to exert a force on the PCB when the computing device enclosure is inserted into a computing device receptacle.

In another embodiment, a computing system is disclosed that includes a computing device receptacle, a computing device inserted into the computing device receptacle, where the computing device includes: an enclosure; a PCB movably affixed to the enclosure; and a force imparting component coupled to the PCB, the force imparting component configured to exert a force on the PCB when the computing device enclosure is inserted into the computing device receptacle.

In another embodiment, a method of manufacturing a computing device is disclose that includes movably affixing a PCB to an enclosure; attaching, to the PCB, a force imparting component, the force imparting component configured to exert a force on the PCB when the computing device enclosure is inserted into a computing device receptacle; and attaching, to the enclosure, the force imparting component.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
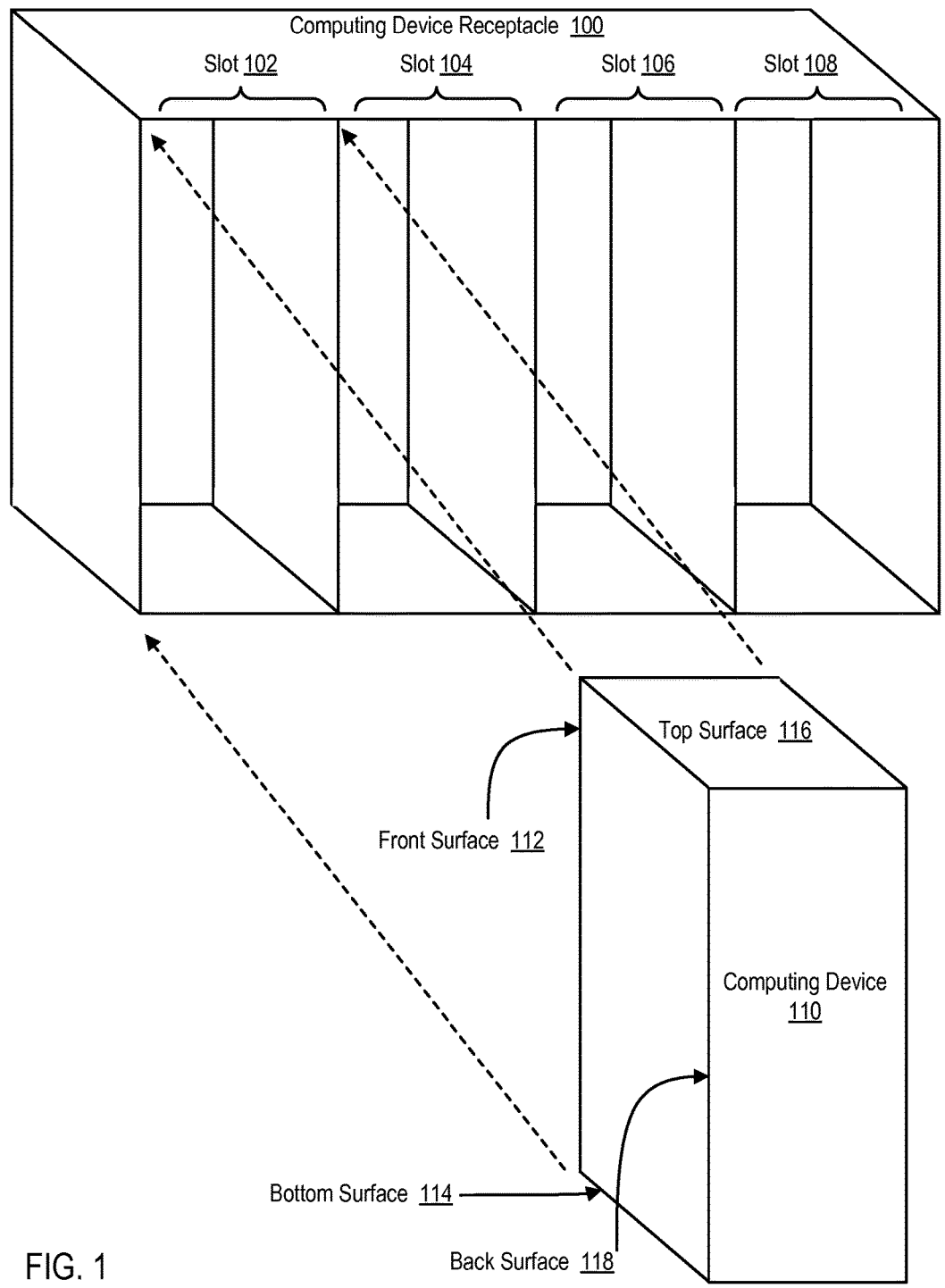
FIG. 1 sets forth a block diagram of a computing system according to embodiments of the present disclosure.

Example methods, apparatuses, and products related to a compliant PCB within an enclosure in accordance with the present invention are described with reference to the accompanying drawings, beginning with FIG. 1. FIG. 1 sets forth a block diagram of a computing system according to embodiments of the present disclosure. The computing system depicted in FIG. 1 includes a computing device receptacle (100). The computing device receptacle (100) may be embodied as a chassis or other mounting apparatus for mounting modular computing devices. The computing device receptacle (100) may include a plurality of slots (102, 104, 106, 108) configured to receive and mount a computing device (110). Each of the slots (102, 104, 106, 108) may be identically sized or the slots (102, 104, 106, 108) may vary in size such that the computing device receptacle (100) can support computing devices of differing types and differing physical dimensions. Examples of such a computing device receptacle (100) can include, for example, a rack for mounting servers, a rack for mounting storage devices that are part of a storage array, a rack that supports power supplies, data communications equipment, or any other support structure for mounting a combination of modular computing components.

The computing system depicted in FIG. 1 can include a computing device (110) inserted into the computing device receptacle (100), although in the example depicted in FIG. 1 the computing device (110) is not inserted into the computing device receptacle (100). Readers will appreciate that the computing device receptacle (100) may include connectors and other mechanisms for coupling to the computing device (110) when the computing device (110) is inserted into the computing device receptacle (100). For example, the computing device (110) may include an opening at one end of the computing device (110) that exposes the edge of a PCB and the computing device receptacle (100) may include a socket configured to receive the edge of the PCB. In such a way, when the computing device (110) is inserted into the computing device receptacle (100), an electrical connection may be established between the computing device (110) and a device (e.g., a server, data communications hardware) that is coupled to the socket that has received the edge of the PCB.

The computing device (110) depicted in FIG. 1 includes a top surface (116), a bottom surface (114), a front surface (112), and a back surface (118). Although many of the details of the computing device (110) are not depicted in FIG. 1, the computing device (110) may be similar to the computing devices described below with reference to the figures described below, including FIG. 2A, FIG. 2B, FIG. 3A, and FIG. 3B.

Figure 2A:
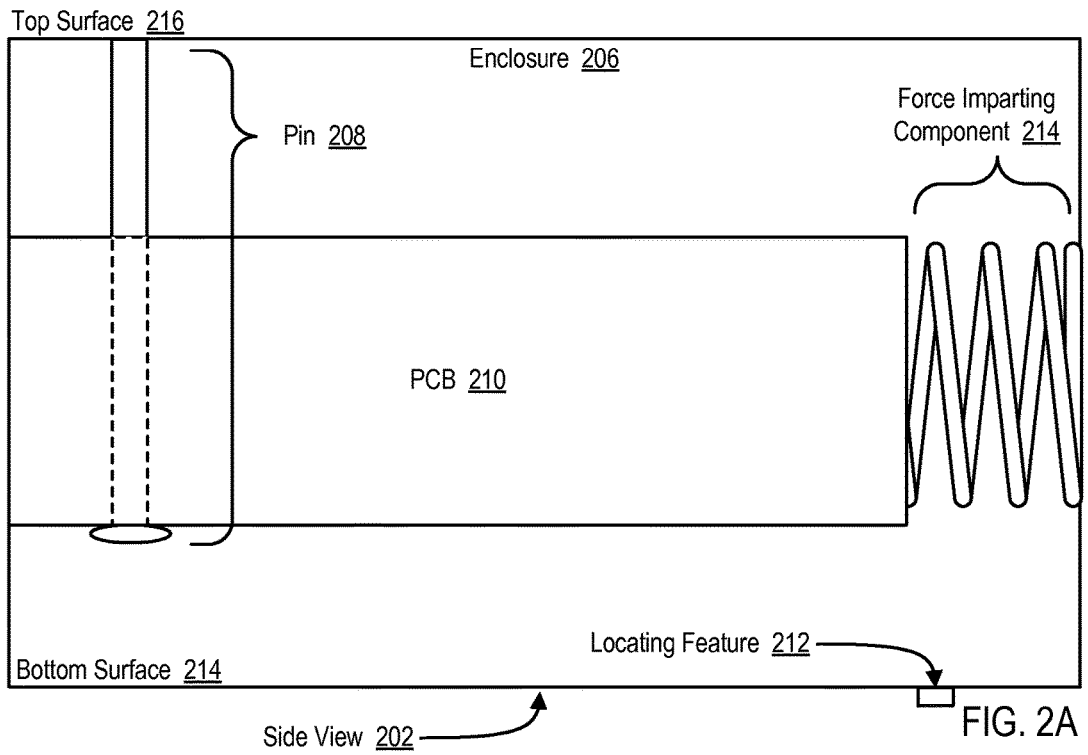
FIG. 2A sets forth a side view of a computing device according to embodiments of the present disclosure.
Figure 2B:
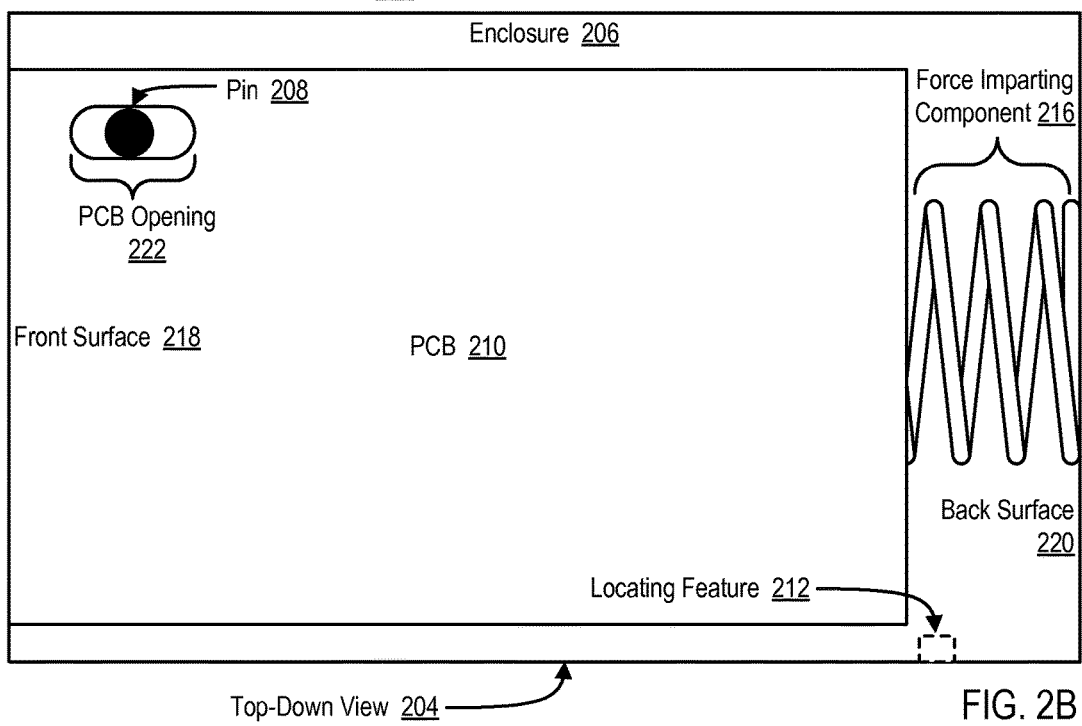
FIG. 2B sets forth a top-down view of a computing device according to embodiments of the present disclosure.

For further explanation, FIG. 2A and FIG. 2B sets forth two views (202, 204) of a computing device according to embodiments of the present disclosure. The views include a side view (202) that depicts the computing device from the perspective where the top surface (216) is above the bottom surface (214), as well as a top-down view (204) that depicts the computing device from the perspective where a front surface (218) is to the left of the back surface (220), such that the computing device is viewed from above the computing device and looking down on the computing device.

Readers will appreciate that the computing device depicted in FIGS. 2A and 2B may be inserted into a computing device receptacle such as the computing device receptacle (100) described above with reference to FIG. 1. More specifically, the computing device depicted in FIGS. 2A and 2B may be inserted into a computing device receptacle by first inserting the front surface (118) of the enclosure (106) into the computing device receptacle and inserting the enclosure (106) deeper into the computing device receptacle until the portion of the PCB (110) that is closest to the front surface (118) of the computing device is coupled to a connector that is mounted, directly or indirectly, in the computing device receptacle.

The computing device depicted in FIG. 2A and FIG. 2B includes an enclosure (206). The enclosure (206) depicted in FIG. 2A and FIG. 2B represents a physical structure designed to house computing components. The enclosure (206) may protect the computing components contained therein from dust particles, radiation, external physical forces, as well as provide mounting structures for mounting the computing components within the enclosure (206). The enclosure (206) may also be designed such that the enclosure (206) may be mounted within a larger computing system. For example, the computing enclosure (206) may house computer memory devices that may be mounted within a larger memory system.

The computing device depicted in FIG. 2A and FIG. 2B also includes a PCB (210) that is movably affixed to the enclosure (206). The PCB (210) is 'movably affixed' to the enclosure (206) in the sense that the position of the PCB (210) within the enclosure (206) may change. The PCB (210) may be attached to the enclosure (206), for example, via a pin, a flexible standoff, mounting rails within the enclosure (206), or some other mechanism that enables the PCB (210) to move within the enclosure (206). By enabling the position of the PCB (210) within the enclosure (206) to change, variances in the expected sizes of other components, variances in the expected couplings of other components, and other variances may be tolerated.

In the examples depicted in FIG. 2A and FIG. 2B, the PCB (210) may be movably affixed to the enclosure (206) via a pin (208) inserted through an opening (222) in the PCB (210). In such an example, the pin (208) may be rigidly affixed to the enclosure (206) so that the pin (208) does not move relative to the enclosure (206). The opening (222) in the PCB (210), however, may be sized such that the PCB (210) may be able to slide closer towards the back surface (220) or closer towards the front surface (218). In such a way, the position of the PCB (210) within the enclosure (206) may change if the PCB (210) slides closer towards the back surface (220) or closer towards the front surface (218).

The computing device depicted in FIG. 2A and FIG. 2B also includes a force imparting component (216) coupled to the PCB (210). The force imparting component (216) of FIG. 2A and FIG. 2B may be embodied, for example, as a spring that is affixed to the enclosure (206) and also affixed to the PCB (210). In the examples depicted in FIG. 2A and FIG. 2B, the force imparting component (216) is configured to exert a force on the PCB (210) that pushes the PCB (210) towards the front surface of the enclosure (206).

The force imparting component (216) may be configured to exert a force on the PCB (210) when the computing device enclosure (206) is inserted into a computing device receptacle. As described above, the portion of the PCB (210) that is closest to the front surface (218) of the computing device may be coupled to a connector that is mounted, directly or indirectly, in the computing device receptacle. As such, the force imparting component (216) may be configured to exert a force on the PCB (210) that pushes the PCB (210) towards the front surface of the enclosure (206), thereby pushing the PCB (210) towards a connector that is mounted in the computing device receptacle. In such a way, the force imparting component (216) may be useful in establishing an electrical connection between the PCB (210) and one more other computing devices that are mounted, or in communications with one or more other computing devices that are mounted, within the computing device receptacle as part of a larger computing system.

In the examples depicted in FIG. 2A and FIG. 2B, the force imparting component (216) coupled to the PCB may be embodied as a spring. In such an example, the spring may be coupled to the PCB (210) and also coupled to the enclosure (206). Readers will appreciate that because a spring may experience differing levels of compression, the spring may be useful in allowing the PCB (210) to be moved within the enclosure (206). For example, in an embodiment where the PCB (210) is coupled to a connector mounted on the computing device receptacle that extrudes relatively deep into the enclosure (206), the spring may be relatively compressed such that the PCB (210) is closer to the back surface (220) of the enclosure (206). In contrast, in an embodiment where the PCB (210) is coupled to a connector mounted on the computing device receptacle that does not extrude relatively deep into the enclosure (206), the spring may be relatively uncompressed such that the PCB (210) is closer to the front surface (218) of the enclosure (206).

The computing device depicted in FIG. 2A and FIG. 2B also includes a fixed locating feature (212) that is attached to the enclosure (206). The fixed locating feature (212) may be configured to mechanically couple with a computing device receptacle when the computing device enclosure (206) is inserted into the computing device receptacle. For example, the computing device receptacle may include a mounting apparatus that has a notch, such that the fixed locating feature (212) is inserted into the notch when the computing device enclosure (206) is inserted into the computing device receptacle. In such a way, the fixed locating feature (212) is useful in securing the computing device to the computing device receptacle.

In the examples depicted in FIG. 2A and FIG. 2B, the enclosure (206) may be embodied as a solid-state drive ('SSD') carrier and the PCB (210) may physically support a plurality of flash modules. The flash modules may be embodied, for example, as NAND flash or other integrated circuit ('IC') assemblies that reside on the PCB (210). In such an example, the computing device may be embodied as an SSD that is included in a larger storage array.

Figure 3A:
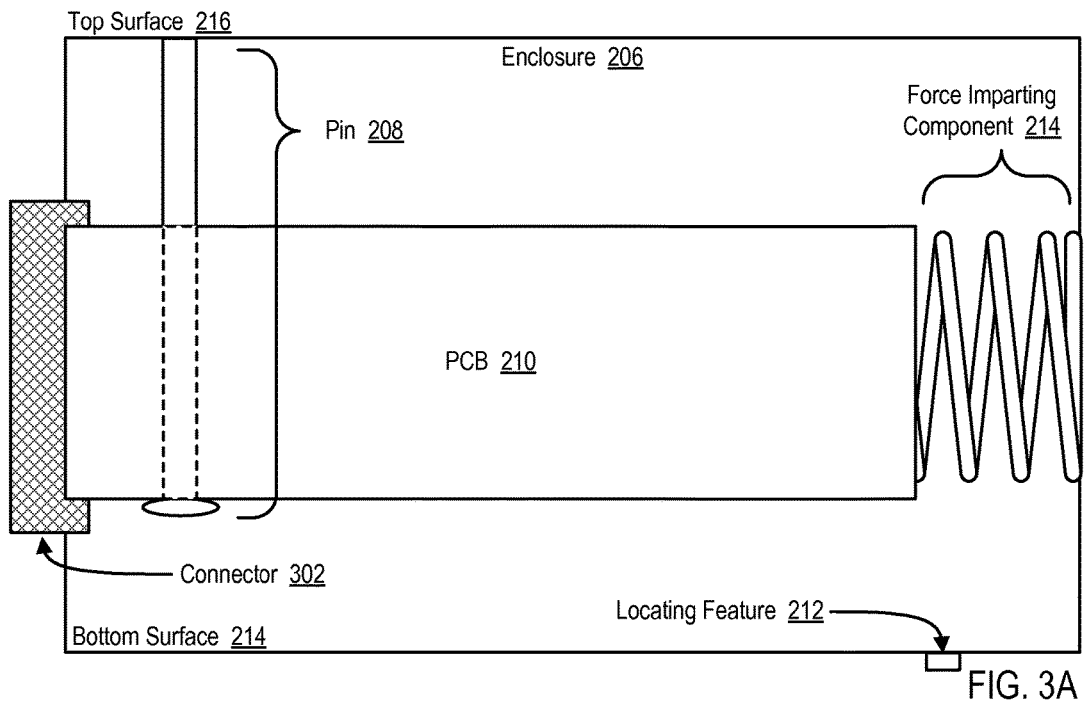
FIG. 3A sets forth a side view of a computing device according to embodiments of the present disclosure.
Figure 3B:
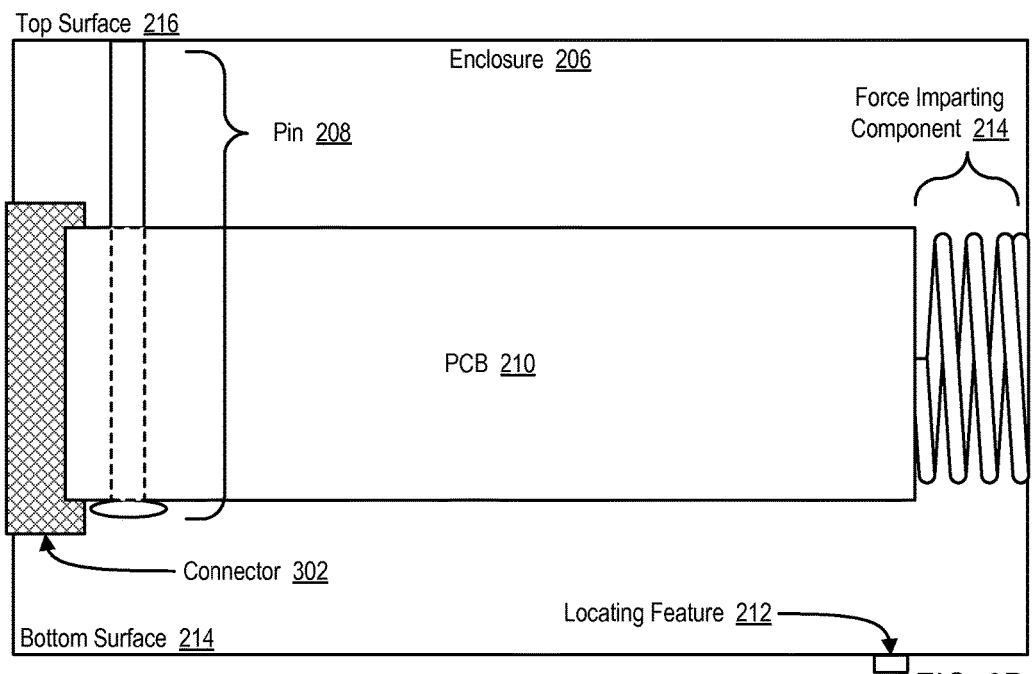
FIG. 3B sets forth an additional side view of a computing device according to embodiments of the present disclosure.

For further explanation, FIG. 3A and FIG. 3B sets forth side views that depict the computing device from the perspective where the top surface (216) is above the bottom surface (214). The examples depicted in FIG. 3A and FIG. 3B are similar to the examples depicted in FIG. 2A and FIG. 2B, as the examples depicted in FIG. 3A and FIG. 3B also include a pin (208) that is fixed to the enclosure (206), a PCB (210) that is movably affixed to the enclosure (206) via the pin (208), a fixed locating feature (212) attached to the enclosure (206), and a force imparting component (214) that is attached to the PCB (210) and the enclosure (206).

In the example depicted in FIG. 3A and FIG. 3B, a connector (302) is depicted. Such a connector (302) may be mounted on a computing device receptacle and configured to receive the PCB (210) when the computing device is inserted into the computing device receptacle. In the example depicted in FIG. 3A, inserting the computing device into the computing device receptacle causes a relatively small portion of the connector (302) to be located within the enclosure (206). As such, the force imparting component (214) which is embodied in this example as a spring, is relatively uncompressed. In the example depicted in FIG. 3B, however, inserting the computing device into the computing device receptacle causes a larger portion of the connector (302) to be located within the enclosure (206). As such, the force imparting component (214) which is embodied in this example as a spring, is relatively compressed and the PCB moves further towards the back surface of the enclosure (206). Readers will appreciate that through the use of a compliant PCB, the computing device may be successfully inserted into computing device enclosures whose dimensions are not identical because of a manufacturing defect, assembly defect, or some other cause.

Figure 4A:
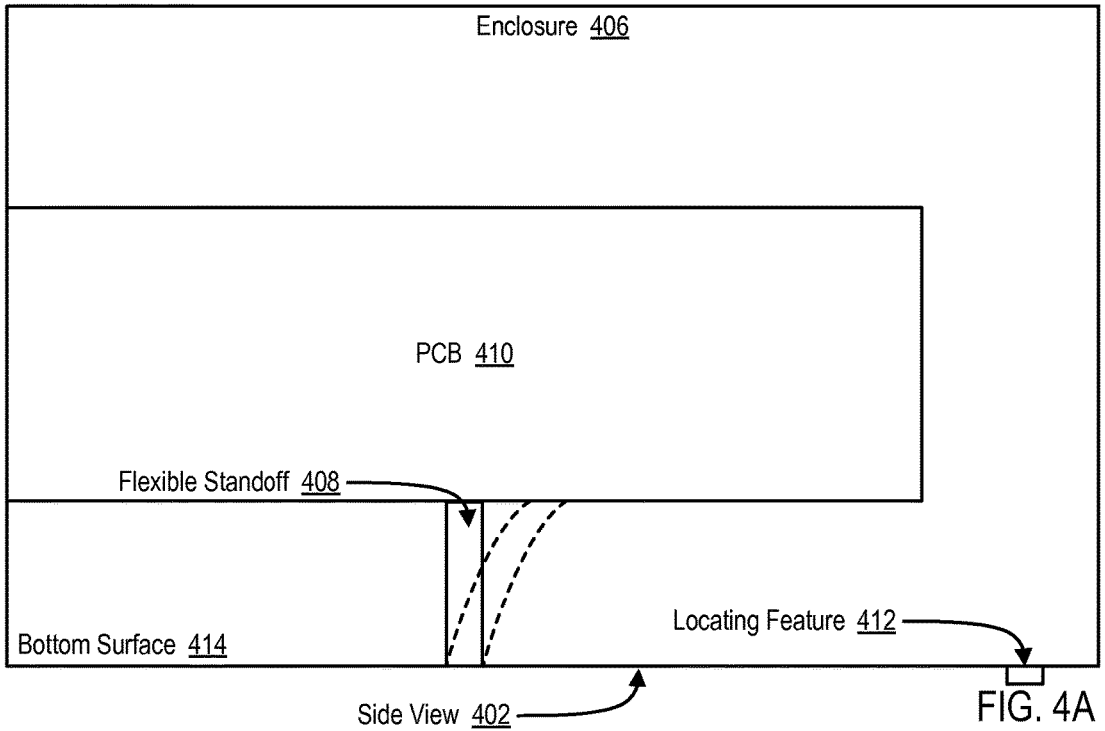
FIG. 4A sets forth a side view of a computing device according to embodiments of the present disclosure.
Figure 4B:
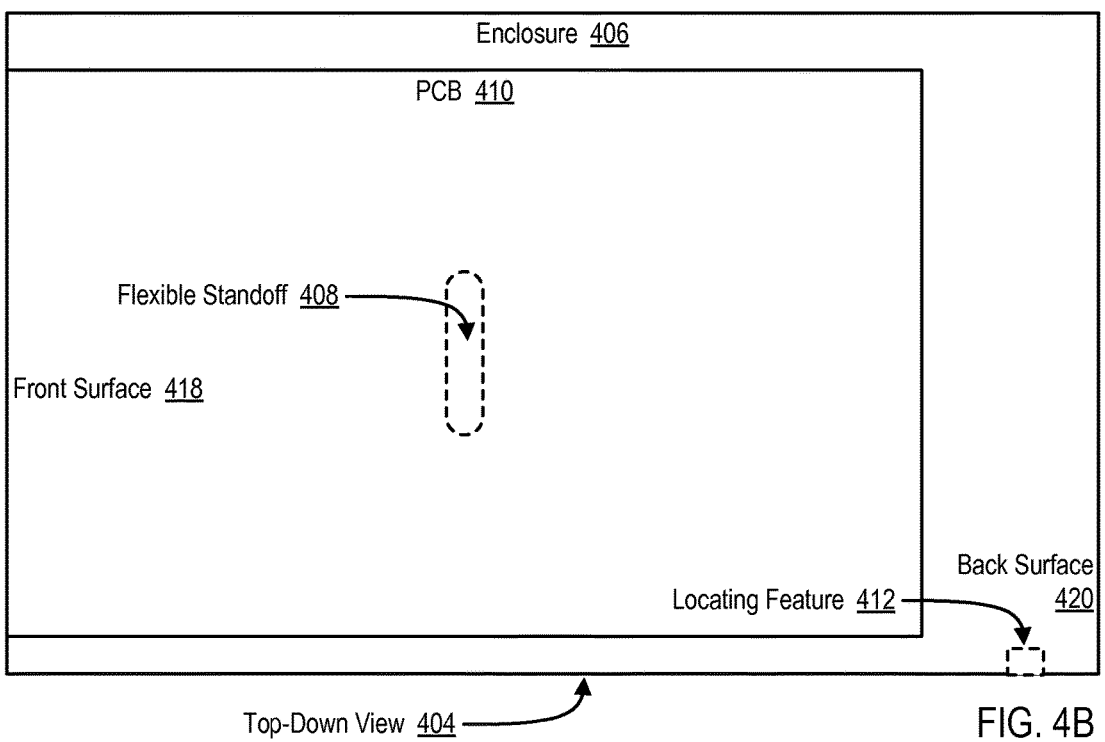
FIG. 4B sets forth a top-down view of a computing device according to embodiments of the present disclosure.

For further explanation, FIG. 4A and FIG. 4B set forth two views (402, 404) of a computing device according to embodiments of the present disclosure. The depicted views include a side view (402) that depicts the computing device from the perspective where the top surface (416) is above the bottom surface (414), as well as a top-down view (404) that depicts the computing device from the perspective where a front surface (418) is to the left of the back surface (420), such that the computing device is viewed from above the computing device and looking down on the computing device.

The computing device depicted in FIG. 4A and FIG. 4B is similar to the computing device depicted in FIG. 2A and FIG. 2B, as the computing device depicted in FIG. 4A and FIG. 4B also includes an enclosure (406), a PCB (410) that is movably affixed to the enclosure (406), a fixed locating feature (412) that is attached to the enclosure (406), and a force imparting component coupled to the PCB, which in FIG. 4A and FIG. 4B is embodied as a flexible standoff (408).

In the example depicted in FIG. 4A and FIG. 4B, the PCB (410) is movably affixed to the enclosure (406) via flexible standoff (408) that is coupled to the PCB (410) and also coupled to the enclosure (406). The flexible standoff (408) may be embodied as a separator that is used to create space between the PCB (410) and the enclosure (406). In the example depicted in FIG. 4A and FIG. 4B, the flexible standoff (408) may be constructed of a plastic material or other material capable of bending. In such an example, the flexible standoff (408) may serve as a force imparting component, as the flexible standoff may be constructed such that the flexible standoff (408) provides a resistive force when an attempt to push the PCB (410) towards the back surface (420) occurs. In such an example, the flexible standoff (408) and the PCB (410) may be configured such that the PCB (410) is naturally positioned so far towards the front surface (418) of the enclosure (406), that attempting to insert the computing device into a computing device receptacle will require that a force is exerted on the PCB (410) that pushes the PCB (410) towards the back surface (420). In such an example, the flexible standoff (408) may flex (as indicated by the dotted lines of FIG. 4A) and exert a force on the PCB (410) pushing the PCB (410) towards the front surface (418) of the enclosure (406) and securing the PCB (410) to a connector mounted, directly or indirectly, in the computing device receptacle.

Figure 5A:
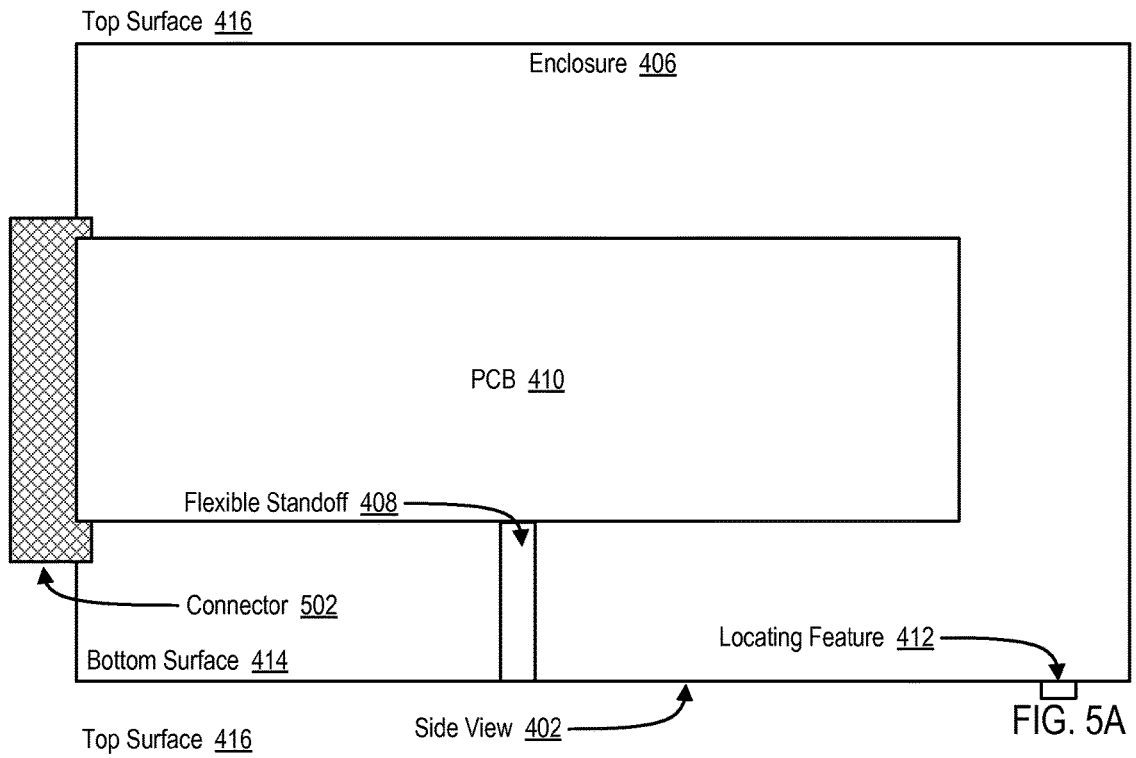
FIG. 5A sets forth a side view of a computing device according to embodiments of the present disclosure.
Figure 5B:
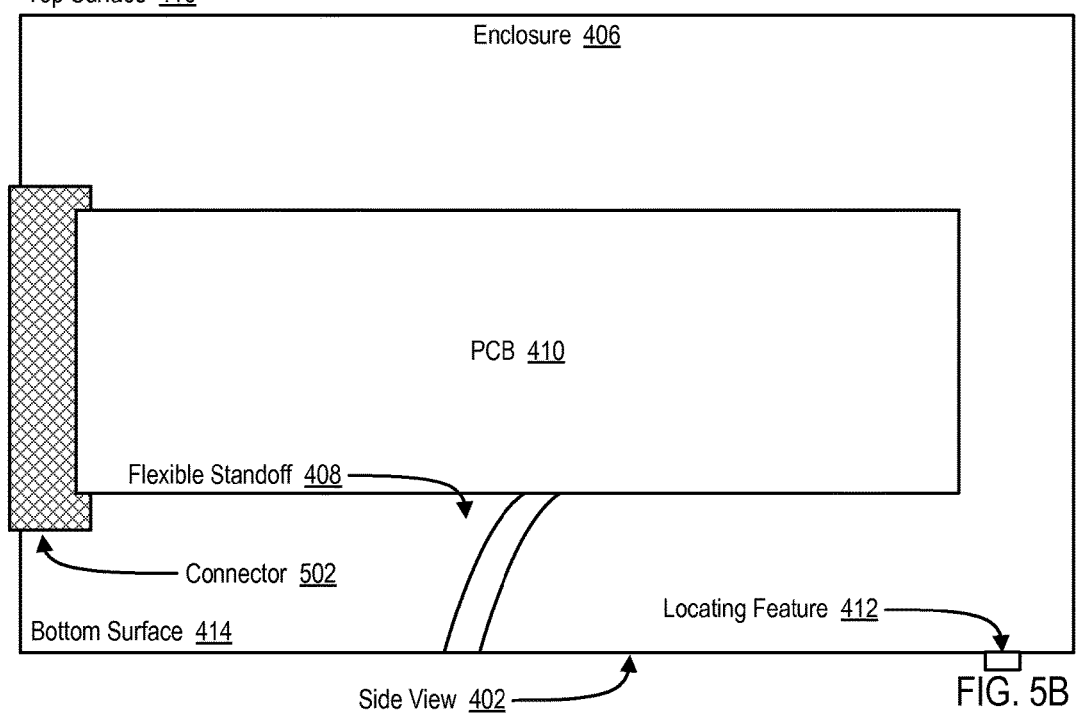
FIG. 5B sets forth an additional side view of a computing device according to embodiments of the present disclosure.

For further explanation, FIG. 5A and FIG. 5B sets forth side views that depict the computing device from the perspective where the top surface (416) is above the bottom surface (414). The examples depicted in FIG. 5A and FIG. 5B are similar to the examples depicted in FIG. 4A and FIG. 4B, as the examples depicted in FIG. 4A and FIG. 4B also include a flexible standoff (408) that is fixed to the enclosure (406), a PCB (410) that is movably affixed to the enclosure (406) via the flexible standoff (408), a fixed locating feature (412) attached to the enclosure (406), and a force imparting component (embodied here as the flexible standoff) that is attached to the PCB (410) and the enclosure (406).

In the example depicted in FIG. 5A and FIG. 5B, a connector (502) is depicted. Such a connector (502) may be mounted on a computing device receptacle and configured to receive the PCB (410) when the computing device is inserted into the computing device receptacle. In the example depicted in FIG. 5A, inserting the computing device into the computing device receptacle causes a relatively small portion of the connector (502) to be located within the enclosure (406). As such, the flexible standoff (408) is relatively upright and the PCB has not significantly transitioned towards the back surface of the enclosure (406). In the example depicted in FIG. 5B, however, inserting the computing device into the computing device receptacle causes a larger portion of the connector (502) to be located within the enclosure (406). As such, the flexible standoff (408) is flexed a relatively large amount and the PCB (410) moves further towards the back surface of the enclosure (406). Readers will appreciate that through the use of a compliant PCB, the computing device may be successfully inserted into computing device enclosures whose dimensions are not identical because of a manufacturing defect, assembly defect, or some other cause.

Figure 6:
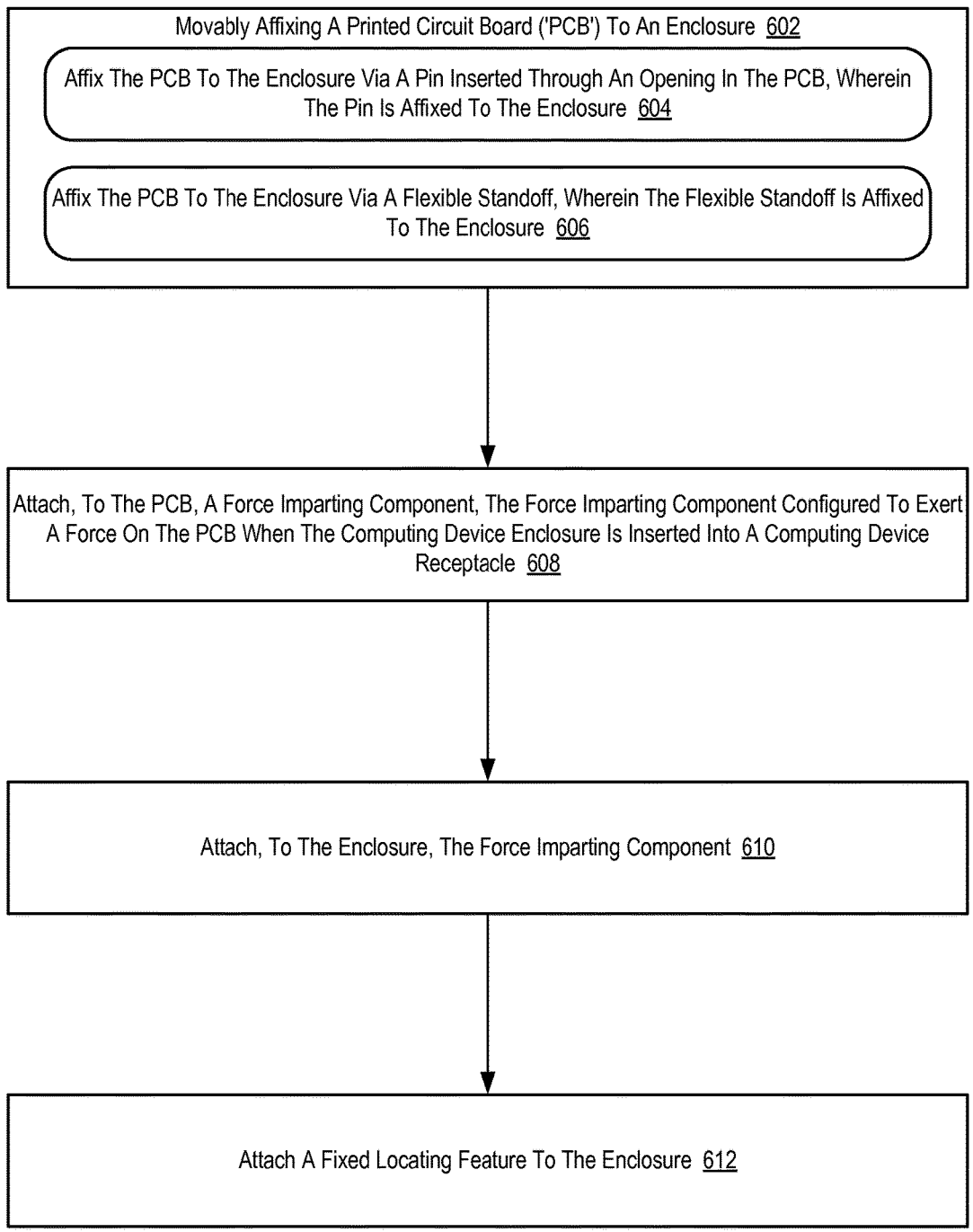
FIG. 6 sets forth a flow chart illustrating an example method for manufacturing a computing device according to embodiments of the present disclosure.

For further explanation, FIG. 6 sets forth a flow chart illustrating an example method for manufacturing a computing device according to embodiments of the disclosure. The example method depicted in FIG. 6 includes movably (602) affixing a PCB to an enclosure. In the example method depicted in FIG. 6, movably (602) affixing a PCB to an enclosure may be carried out by affixing (604) the PCB to the enclosure via a pin inserted through an opening in the PCB, where the pin is also affixed to the enclosure. Alternatively, movably (602) affixing a PCB to an enclosure may be carried out by affixing (606) the PCB to the enclosure via a flexible standoff, where the flexible standoff is also affixed to the enclosure.

The example method depicted in FIG. 6 also includes attaching (608), to the PCB, a force imparting component. The force imparting component may be configured to exert a force on the PCB when the computing device enclosure is inserted into a computing device receptacle. The force imparting component may be embodied, for example, as a spring, a flexible standoff, and so on.

The example method depicted in FIG. 6 also includes attaching (610), to the enclosure, the force imparting component. The force imparting component may be configured to exert a force pushing the PCB toward a computing device receptacle when the computing device is inserted into a computing device receptacle.

The example method depicted in FIG. 6 also includes attaching (612) a fixed locating feature to the enclosure. The fixed locating feature may be configured to mechanically couple with the computing device receptacle when the computing device enclosure is inserted into the computing device receptacle. Although the example depicted in FIG. 6 illustrates an embodiment where various steps appear to occur in a certain order, readers will appreciate that all orderings of the claimed steps are contemplated and in accordance with embodiments of the present disclosure.

Example embodiments of the present invention are described largely in the context of a fully functional computer system for emulating an RDMA link between controllers in a storage array according to embodiments of the present invention. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computing device, comprising:
   an enclosure that includes a pin;
   a printed circuit board ('PCB') that includes an opening, wherein the pin slides through and within the opening of the PCB such that the PCB is movably affixed to the enclosure and the PCB has a range of motion relative to the enclosure when the pin is within the opening of the PCB; and
   a force imparting component coupled to the PCB, the force imparting component configured to exert a force on the PCB when the computing device enclosure is inserted into a computing device receptacle.

2. The computing device of claim 1 wherein the PCB is movably affixed to the enclosure via flexible standoff coupled to the PCB and also coupled to the enclosure.

3. The computing device of claim 1 wherein the force imparting component coupled to the PCB includes a spring, the spring coupled to the PCB and also coupled to the enclosure.

4. The computing device of claim 1 wherein the force imparting component is configured to exert a force pushing the PCB toward the computing device receptacle.

5. The computing device of claim 1 further comprising a fixed locating feature attached to the enclosure, the fixed locating feature configured to mechanically couple with the computing device receptacle when the computing device enclosure is inserted into the computing device receptacle.

6. The computing device of claim 1 wherein the enclosure is solid-state drive ('SSD') carrier and the PCB physically supports a plurality of flash modules.

7. A computing system, comprising:
   a computing device receptacle;
   computing device inserted into the computing device receptacle, the computing device comprising:
      an enclosure that includes a pin;
      a printed circuit board ('PCB') that includes an opening, wherein the pin slides through and within the opening of the PCB such that the PCB is movably affixed to the enclosure and the PCB has a range of motion relative to the enclosure when the pin is within the opening of the PCB; and
      a force imparting component coupled to the PCB, the force imparting component configured to exert a force on the PCB when the computing device enclosure is inserted into the computing device receptacle.

8. The computing system of claim 7 wherein the PCB is movably affixed to the enclosure via flexible standoff coupled to the PCB and also coupled to the enclosure.

9. The computing system of claim 7 wherein the force imparting component coupled to the PCB includes a spring, the spring coupled to the PCB and also coupled to the enclosure.

10. The computing system of claim 7 wherein the force imparting component is configured to exert a force pushing the PCB toward the computing device receptacle.

11. The computing system of claim 7 further comprising a fixed locating feature attached to the enclosure, the fixed locating feature configured to mechanically couple with the computing device receptacle when the computing device enclosure is inserted into the computing device receptacle.

12. The computing system of claim 7 wherein the enclosure is solid-state drive ('SSD') carrier and the PCB physically supports a plurality of flash modules.

* * * * *